United States Patent

Destannes et al.

[11] Patent Number: 5,287,382
[45] Date of Patent: Feb. 15, 1994

[54] WALL ELECTRODE FOR A DC ELECTRIC METALLURGICAL FURNACE

[75] Inventors: Philippe Destannes, Metz; Jean-Claude Grosjean, Valenciennes; Ghislain Maurer, Chatel Saint Germain; Christian Lebrun, Valenciennes, all of France

[73] Assignee: Unimetal, Metz, France

[21] Appl. No.: 950,150

[22] Filed: Sep. 24, 1992

[30] Foreign Application Priority Data

Sep. 30, 1991 [FR] France .................. 91 12001

[51] Int. Cl.⁵ .............................. H05B 7/00
[52] U.S. Cl. ........................ 373/72; 373/71; 373/36; 373/45; 373/94; 373/108
[58] Field of Search ........ 373/72, 71, 94, 95, 373/108, 30, 36, 37, 38, 44, 45

[56] References Cited

U.S. PATENT DOCUMENTS

| | | | |
|---|---|---|---|
| 4,628,516 | 12/1986 | Voss-Spilker et al. | 373/72 |
| 4,646,316 | 2/1987 | Michelet et al. | 373/72 |
| 4,685,112 | 8/1987 | Michelet et al. | 373/72 |
| 4,697,273 | 9/1987 | Cordier | 373/72 |
| 4,754,464 | 6/1988 | Feuerstake | 373/72 |
| 4,947,405 | 8/1990 | Okada | 373/72 |
| 4,982,411 | 1/1991 | Michelet et al. | 373/72 |
| 5,125,003 | 6/1992 | Hamy et al. | 373/94 |

FOREIGN PATENT DOCUMENTS

| | | |
|---|---|---|
| 0056225 | 7/1982 | European Pat. Off. . |
| 235465 | 9/1987 | European Pat. Off. . |
| 441733 | 8/1991 | European Pat. Off. . |
| 2572873 | 5/1986 | France . |

Primary Examiner—Bruce A. Reynolds
Assistant Examiner—Tu Hoang
Attorney, Agent, or Firm—Oblon, Spivak, McClelland, Maier & Neustadt

[57] ABSTRACT

A wall electrode includes a metal bar adapted to extend through the wall of the furnace, a water-cooled sleeve composed of a material which is a good conductor of heat and electricity, an end member composed of a material which is a good conductor of heat and electricity, and an annular member such as a ring composed of a metal which is heavy and has a low melting point surrounding the bar so that the heavy metal in the liquid state spreads in the space between the bar and the sleeve when the annular member is made to melt during use of the electrode.

4 Claims, 1 Drawing Sheet

WALL ELECTRODE FOR A DC ELECTRIC METALLURGICAL FURNACE

BACKGROUND OF THE INVENTION

The invention relates to a wall electrode for a dc electric metallurgical furnace for producing metals, in particular steel, in the liquid state.

DISCUSSION OF THE BACKGROUND

An electrode of this type is known from the French patent No. 2,572,873 which comprises a metal bar, an end member composed of a material which is a good conductor of heat and electricity and a sleeve which is also a good conductor of heat and electricity. The end member and the sleeve are energetically cooled with water. The sleeve surrounds the bar in a portion of its length with a radial clearance so as to leave a free annular space therebetween.

This technique presents a drawback. Indeed, the scrap steel melted in the furnace to produce liquid steel often contains lead. This lead melts, collects at the bottom of the furnace in the vicinity of the electrode, infiltrates between the refractories of the furnace and the metal bar and unevenly spreads in the free space between the sleeve and the bar; the lead which thus unevenly accumulates in the free space creates small localized contacts which produce electric arcings between the sleeve and the bar; and these electric arcings deteriorate the sleeve.

A wall electrode is also known from EP-A-0,178,981 which comprises a massive part of lead interposed between the body of the electrode extending through the wall and an end member composed of a material which is a good conductor of heat and electricity located outside the wall in the extension of the body of the electrode. In this way the electric contact between the body of the electrode and the conductive end member is improved.

However, this arrangement of a part of the electrode in the form of a massive element of lead is not provided for solving the problem relating to the electric arcing when the lead coming from the molten scrap infiltrates around the electrode.

Another wall electrode is known from EP-56,225 which comprises a wear member of steel which completely covers the upper end of a cooled copper bar extending through the vessel of the furnace and serving to provide an electric connection to the wear member. A layer of metal which has a low thermal conductivity and a high melting enthalpy is provided between the wear member and the copper bar to absorb localized overheatings of the wear member which, in the absence of said layer of metal, might be rapidly transmitted by conduction to the copper bar and produce the melting thereof. Again, this electrode does not solve the aforementioned problems.

SUMMARY OF THE INVENTION

An object of the present invention is to overcome this drawback by proposing a wall electrode for a dc electric metallurgical furnace whose operation is not affected by the presence of lead in the scrap.

The invention therefore provides a wall electrode for a dc electric metallurgical furnace comprising a metal bar extending through the wall of the furnace, a water-cooled sleeve composed of a material which is a good conductor of heat and electricity, coaxial with the bar and surrounding the bar in a part of its length outside the wall with a radial clearance so that there is an annular space between the bar and the cooled sleeve, and an end member composed of a material which is a good conductor of heat and electricity in contact with the cooled sleeve and with the bar at its end outside the wall, characterized in that it further comprises an annular member composed of a heavy metal having a low melting point surrounding the bar in such a disposition that the heavy metal in the liquid state spreads in the annular space provided between the bar and the cooled sleeve when the annular member is made to melt during the use of the electrode.

In a first embodiment of the invention, the annular member of a heavy metal is formed by a ring placed in the extension of the cooled sleeve at the end, adjacent to the wall of the furnace, of the space between the bar and the cooled sleeve.

In a second embodiment of the invention, the annular member of a heavy metal is constituted by a sleeve disposed inside the annular space and interposed between the bar and the sleeve.

Preferably, the heavy metal having a low melting point is lead.

When such an electrode is supplied with power, it becomes heated and heats the lead which melts. The molten lead then occupies the entire space between the metal bar and the sleeve which is a good conductor of heat and electricity. The amount of molten lead is sufficient to ensure a good thermal and electric contact between the bar and the sleeve which is a good conductor. The molten lead coming from the scrap is added to the already present lead and does not create small localized contacts which are responsible for the electric arcing. There is therefore no longer any electric arcing.

The invention will now be described in more detail with reference to the accompanying drawing.

Figure 1:
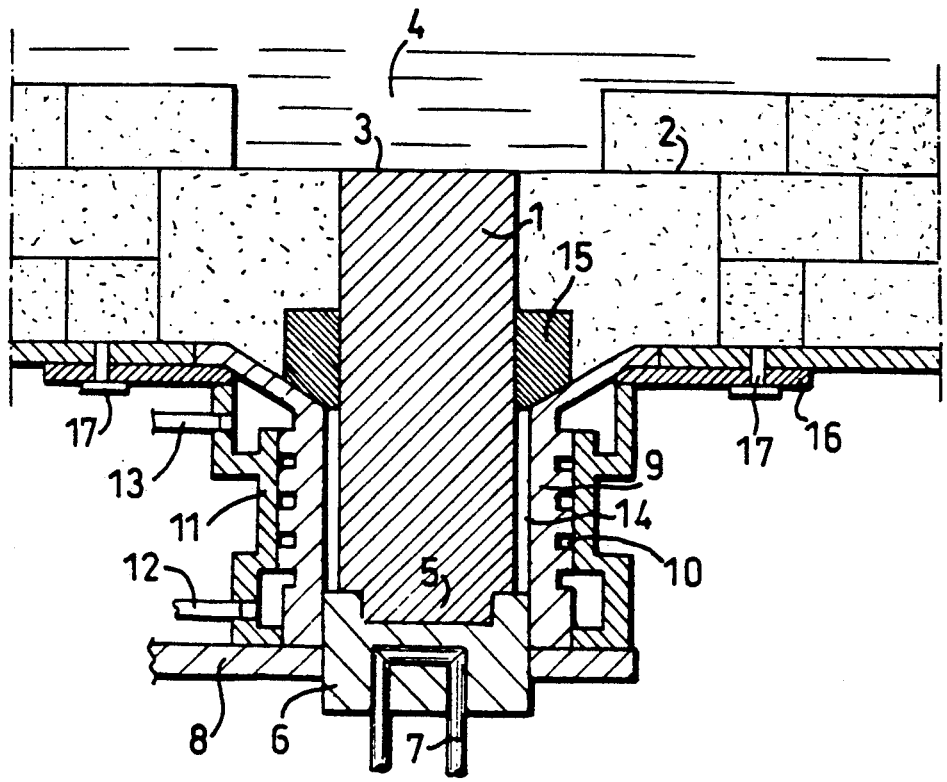
FIG. 1 is a sectional view of a first embodiment of the electrode placed in the wall of a furnace.

In the first embodiment shown in FIG. 1, the electrode comprises a metal bar 1 which extends through the wall 2 of a dc electric metallurgical furnace, such as an arc furnace, for producing liquid steel by melting iron scrap. The bar is, for example, a billet of steel.

The bar 1 is in contact at one of its ends 3 with the liquid steel 4 contained in the furnace. The other end 5 of the bar 1 extends below the wall 2 of the furnace and this end 5 is provided with an end member 6 of copper cooled with a circulation of water 7. The end member 6 is in close contact with a connector 8 which is also of copper and connected to a terminal of a power supply (not shown). The end member 6 has a diameter which is slightly larger than that of the bar 1.

A sleeve 9 of copper which is a good conductor of heat and electricity surrounds the bar 1 on the portion which extends out of the wall 2 of the furnace. This sleeve 9 is in close contact with the end member 6 and the connector 8.

The sleeve is provided at its outer part with a helical groove 10 and is surrounded by a jacket 11 provided with a water inlet 12 and a water outlet 13. The sleeve 9 with its helical groove and the jacket 11 define a circuit in which water can circulate and energetically cool the sleeve 9.

The sleeve 9 has an inside diameter substantially equal to the outside diameter of the end member 6. This diameter is larger than that of the bar 11 and there remains a free space 14 between the sleeve 9 and the bar 1.

Above the sleeve 9, a ring 15 surrounds the bar 1 and closes the space 14.

The ring 15 is composed of a heavy metal having a low melting point, preferably lead.

The assembly is fixed to the wall 2 of the furnace by means of a plate 16 and screws 17.

When the electrode is supplied with power, the circulation of the current heats the bar 1 which heats the ring 15 by conduction.

As the ring 15 is of lead it rapidly melts and the molten lead fills the space 14 and provides a very good electric and thermal contact between the bar 1 and the sleeve 9, the volume of metal of the ring 15 being so predetermined as to be equal to or larger than the volume of the space 14. The lead coming from the scrap and infiltrating between the wall 2 and the bar 1 is added to the molten lead contained in the space 14 without adversely affecting the electric contact.

Figure 2:
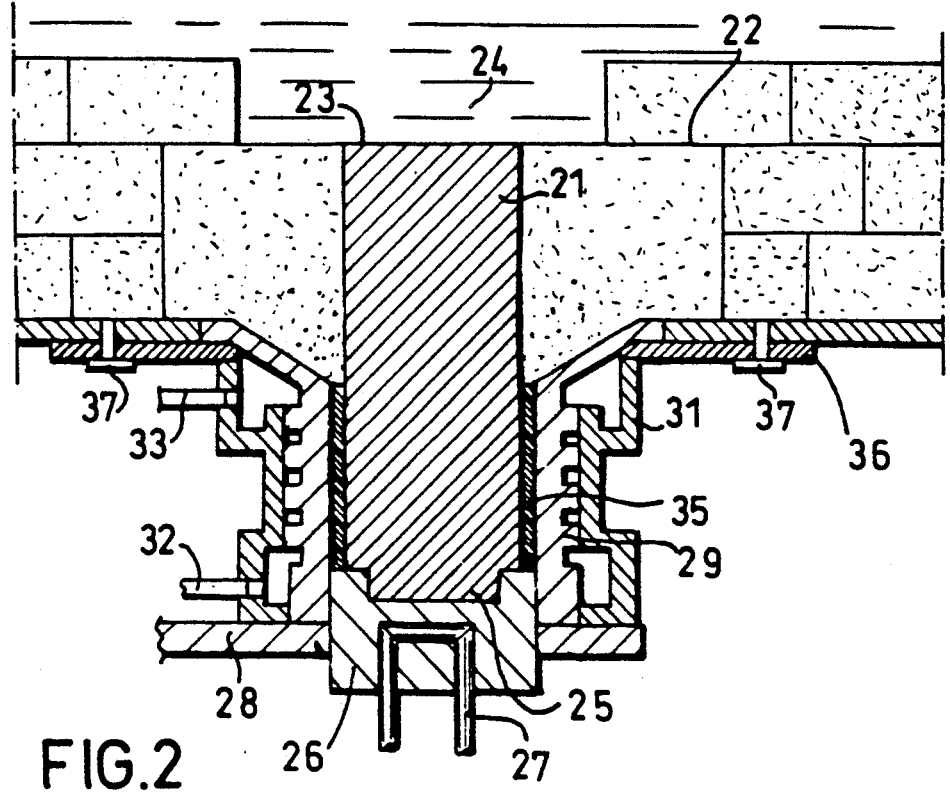
FIG. 2 is a sectional view of a second embodiment of the electrode placed in the wall of a furnace.

In the second embodiment shown in FIG. 2, the electrode comprises a metal bar 21, for example a billet of steel, extending through the wall 22 of a dc electric metallurgical furnace.

The end 23 of the bar 21 is in contact with the liquid steel 24. The other end 25 is provided with an end member 26 of copper cooled by a circulation of water 27.

The bar 21 is surrounded in a part of its length by a sleeve 35 of a heavy metal having a low melting point, for example lead.

The sleeve 35 is surrounded by a sleeve 29 which is a good conductor of heat and electricity, for example of copper. This sleeve 29 is identical to the sleeve 9 shown in FIG. 1. It is surrounded by a jacket 31 which may be supplied with water through ports 32 and 33. The assembly is fixed to the wall 22 of the furnace by means of a plate 36 and screws 37.

The electrode is connected to a terminal of a power supply (not shown) by the connector 28.

When the electrode is supplied with power, it becomes heated by the Joule effect, heats and melts the lead of the sleeve 35 which then provides an excellent electric contact between the bar 21 and the sleeve 29. The molten lead coming from the scrap is added to the lead of the sleeve 35 without adversely affecting the electric contacts and therefore does not produce electric arcing.

In the first embodiment, as soon as the ring 15 has first melted, the lead is in the same disposition as in the second embodiment. However, the first embodiment has the advantage of providing an easier construction of the electrode, since the space 14 is usually of small size and it is simpler to cause the lead to automatically flow therein upon the first melting than to place the thin sleeve 35 in this space 14 when assembling the various component parts of the electrode.

What is claimed is:

1. Wall electrode for a dc electric metallurgical furnace comprising:

a metal bar extending through a wall of said furnace, a water-cooled sleeve made of a material which is a conductor of heat and electricity coaxial with said bar and surrounding said bar along part of a length portion of said bar outside said wall with a radial clearance whereby there is provided an annular space between said bar and said cooled sleeve, an end member composed of a material which is a conductor of heat and electricity in contact with said cooled sleeve and with said bar at an end thereof outside said wall, and an annular member composed of a metal having a low melting point surrounding the bar in a disposition such that said heavy metal in the liquid state spreads into said annular space when said annular member is melted.

2. Wall electrode according to claim 1, wherein said sleeve has an extension and said annular member comprises a ring placed in the extension of said cooled sleeve at an inner end of said annular space.

3. Wall electrode according to claim 1, wherein said annular member comprises a sleeve disposed inside said annular space and interposed between said bar and said sleeve.

4. Wall electrode according to claim 1, wherein said heavy metal having a low melting point comprises lead.

* * * * *